Aug. 1, 1944.    A. W. OEHLER ET AL    2,354,962
WINDROWER
Filed Oct. 7, 1940    5 Sheets-Sheet 1

INVENTORS
Alvin W. Oehler
Donald L. Adams
Shellman S. Harter
BY
ATTORNEYS.

INVENTORS:
Alvin W. Oehler
Donald L. Adams
Wellman S. Harter
ATTORNEYS.

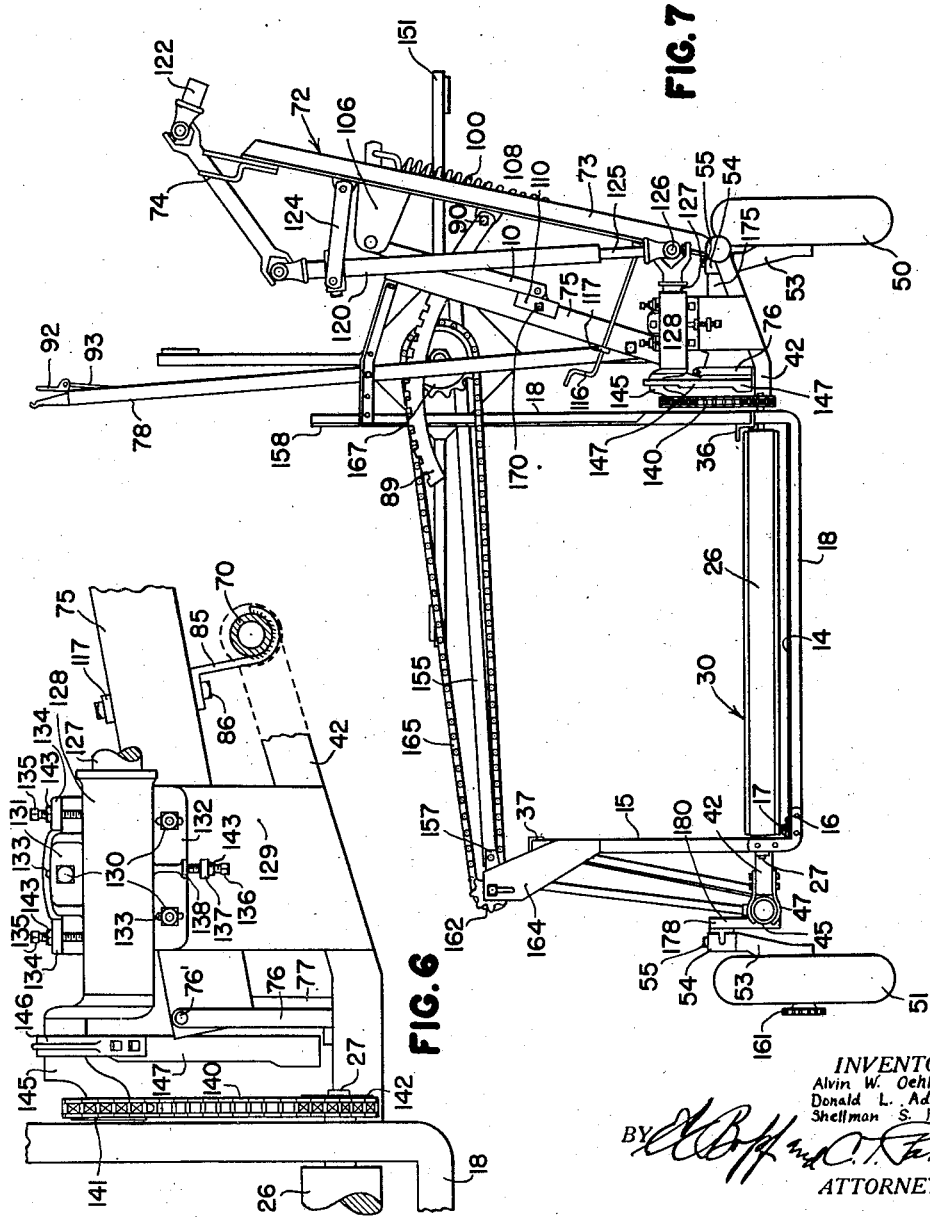

Aug. 1, 1944.　　　A. W. OEHLER ET AL　　　2,354,962
WINDROWER
Filed Oct. 7, 1940　　　5 Sheets-Sheet 5
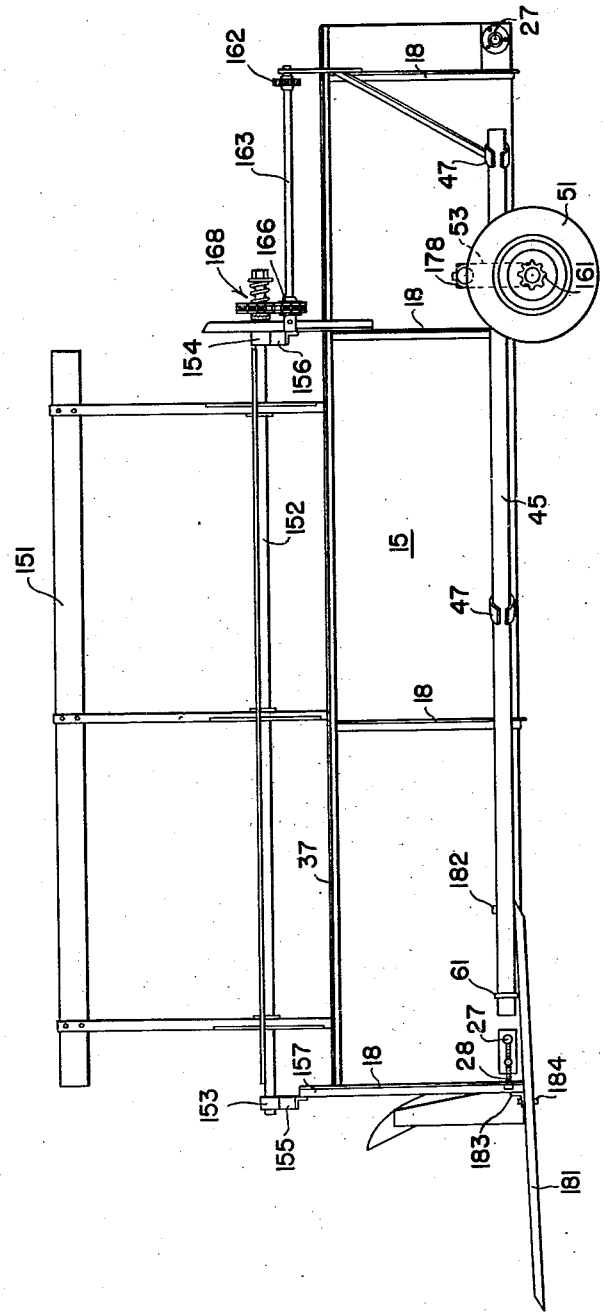
FIG. 8
INVENTOR:
Alvin W. Oehler
Donald L. Adams
Shellman S. Harter
BY 
ATTORNEYS.

Patented Aug. 1, 1944

2,354,962

UNITED STATES PATENT OFFICE 2,354,962

WINDROWER

Alvin W. Oehler and Donald L. Adams, Moline, and Shellman S. Harter, East Moline, Ill., assignors to Deere & Company, Moline, Ill., a corporation of Illinois Application October 7, 1940, Serial No. 360,030

36 Claims. (Cl. 56—23)

The present invention relates to windrowers and has for its principal object the provision of a novel and improved windrower that is compact, light in weight, inexpensive to build and operate, but strong and durable and capable of operation at comparatively high speeds. A further object of our invention has to do with the provision of a windrower which is quickly and easily convertible for transporting the same in an endwise position through narrow gates and along narrow roads.

Another object of our invention relates to the provision of a windrower that is capable of cutting crops extremely close to the ground. Still another object relates to the provision of a windrower that is quickly and easily adjustable to level the platform and eliminate any sag at the outer end of the cutter bar. A further object relates to the provision of a simple and direct power connection from the power take-off shaft of the tractor, and which provides for easily and quickly adjusting the slack in the drive chain. Still a further object relates to the provision of a hitch device incorporating a lifting linkage for tilting the platform to raise and lower the cutter bar and including counterbalancing spring for faciliating such adjustment, and also providing for collapsing the entire hitch mechanism to reduce the width of the machine when the latter is transported endwise.

These and other objects and advantages of our invention will be apparent after a consideration of the following description in which reference is had to the drawings appended hereto, in which Figure 1 is a plan view of a windrower embodying the principles of the present invention, in which the canvas conveyor is broken away to show the frame construction;

Figure 4 is a fragmentary elevation taken along a line 4—4 in Figure 1, and showing the detail of the means for adjusting the grainward end of the platform to prevent sag;

Figure 5 is a detail view showing the means for adjusting the supporting wheels vertically to adjust the height of the rear end of the platform above the ground;

Figure 6 is a side elevation of the rear support for the power shaft, showing the mechanism for vertically adjusting the position of the latter to tighten the drive chain;

Figure 7 is an end elevational view similar to Figure 2, but showing the machine prepared for endwise transport; and Figure 8 is a rear elevation of the windrower prepared for transport.

Figure 1:
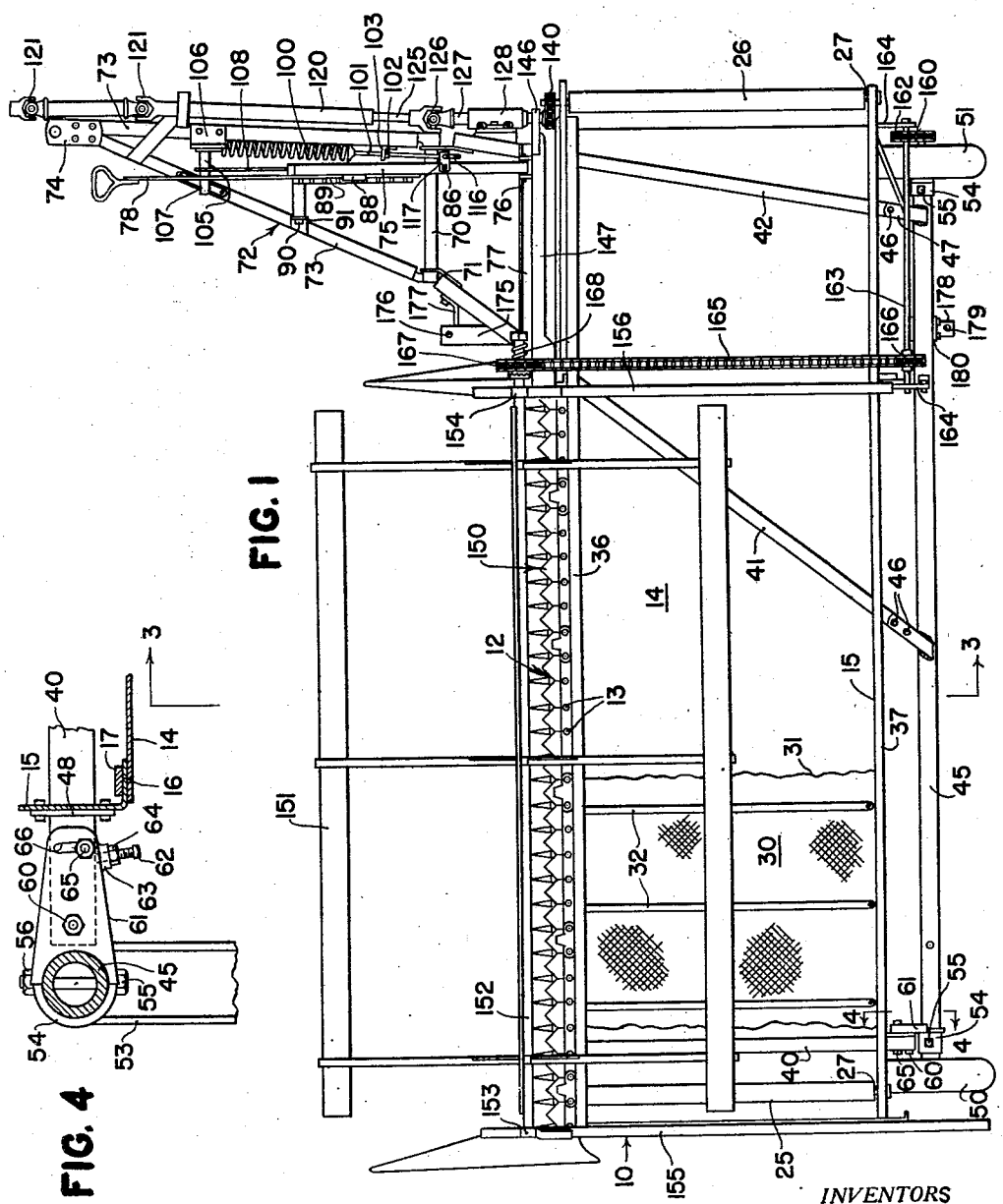
Figure 2:
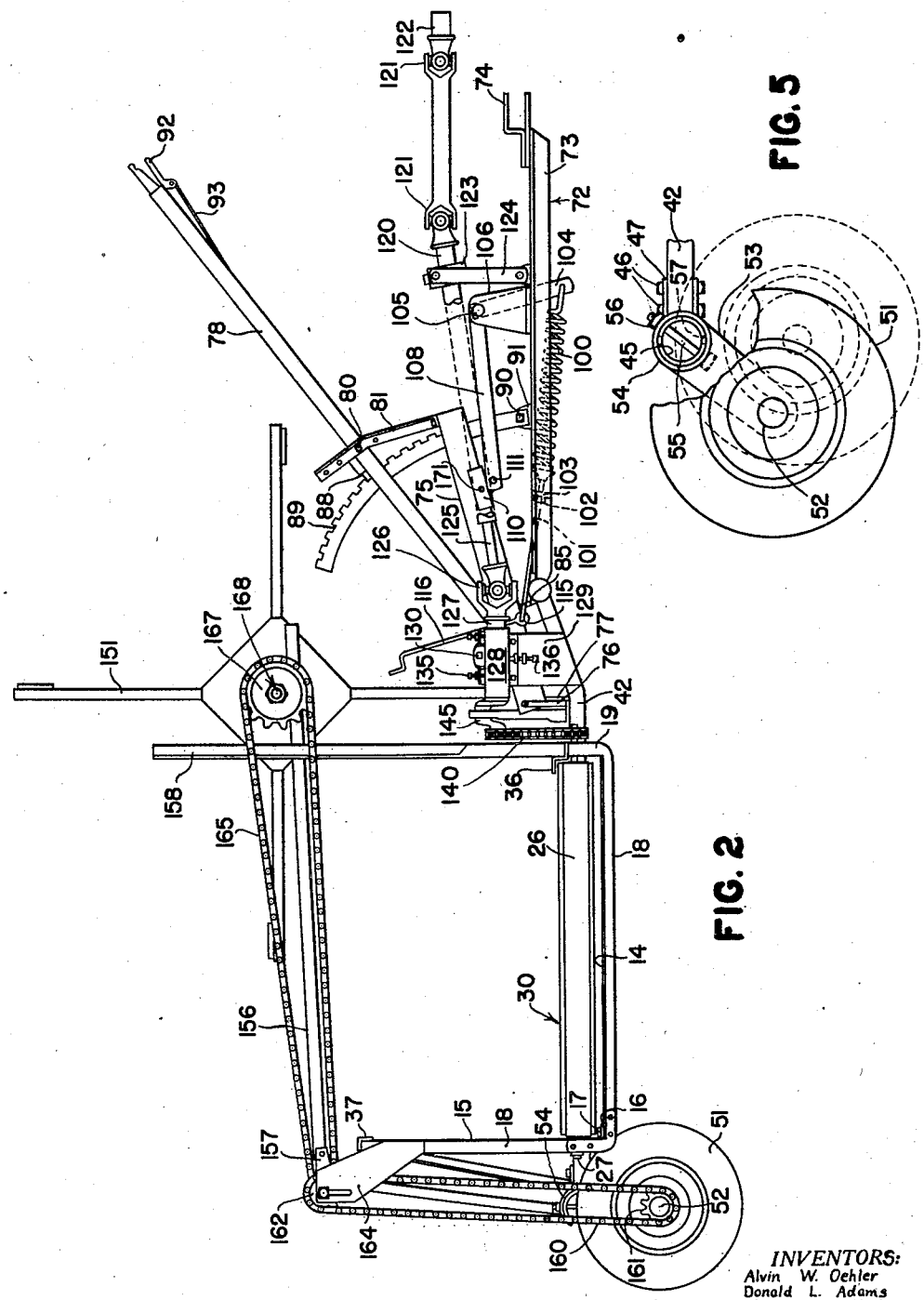
Figure 2 is an end view taken from the stubbleward side of the machine and drawn to a slightly larger scale.
Figure 3:
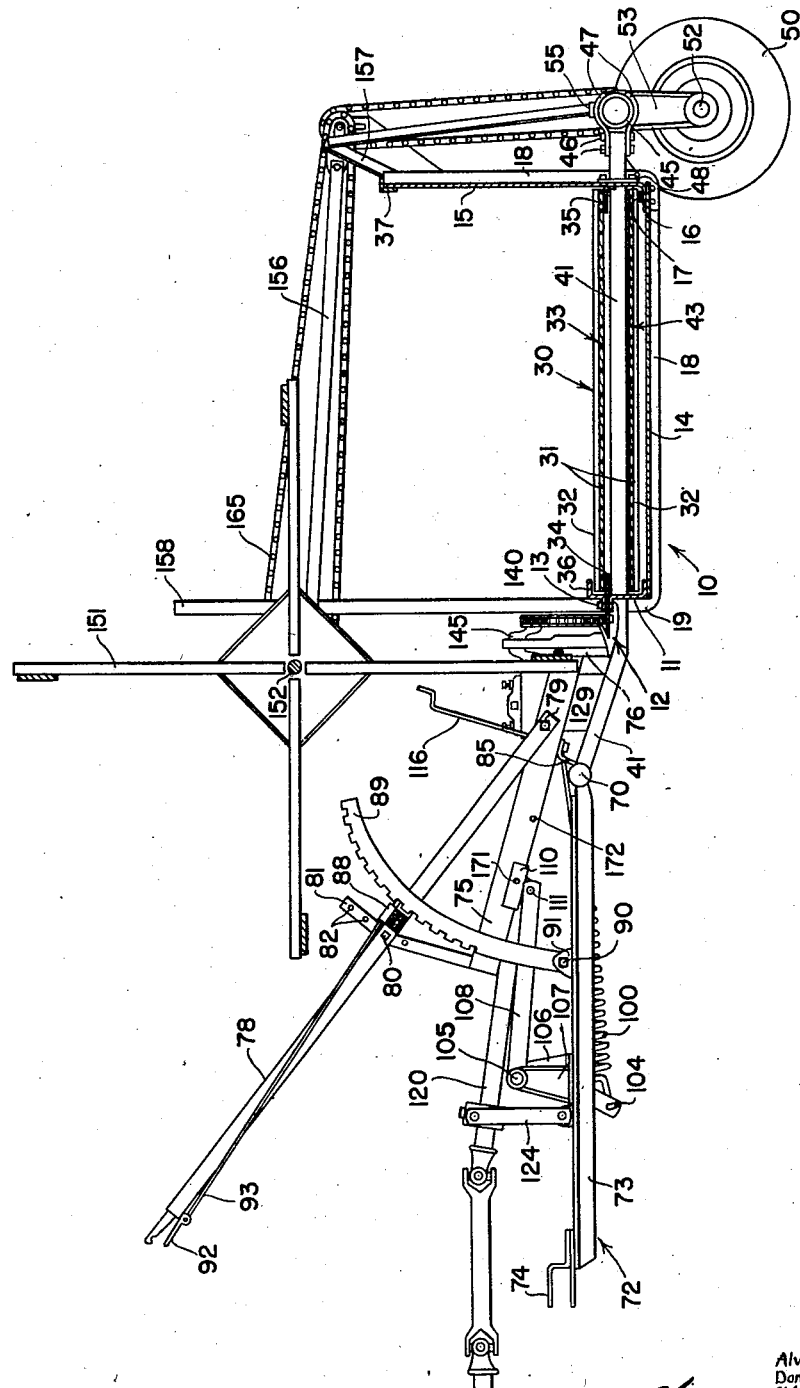
Figure 3 is a sectional elevational view taken along a line 3—3 in Figure 1, but drawn to the scale of Figure 2.

Referring now to the drawings, the windrower comprises a platform 10 which includes a transversely extending Z-shaped front frame member 11, see Figure 3, along the top of which is mounted a conventional cutter bar 12 by means of bolts 13. A bottom wall or panel 14 is connected at its forward end to the bottom of the Z-bar 11. A back wall or panel 15 extends transversely of the platform 10 along the rear edge thereof and is provided with a forwardly turned flange 16 along the bottom edge, which rests upon the rear edge of the bottom panel 14. A strap member 17 extends the entire width of the platform along the upper side of the flange 16 and the bottom wall 14, the flange 16, and the strap member 17 are suitably connected rigidly together by rivets or other suitable means. The back wall and bottom wall 15, 14 are reenforced by lightweight angle iron braces 18 extending vertically behind the back wall 15, horizontally under the bottom wall 14 and are rigidly secured thereto by suitable rivets or the like. The forward ends of the braces 18 turn upwardly at 19 in front of the Z-bar 11 and are rigidly attached thereto.

At each end of the platform 10 is journaled a conveyor roller 25, 26. Each of the rollers includes a supporting shaft 27 which is mounted at its forward end on the Z-bar 11 and at its rearward end on the back wall 15. The grainward roller 25 is adjustable laterally for the purpose of tightening the conveyor by means of a pair of bolts 28 engaging the outer brace 18. Trained over the rollers 25, 26 is a flexible endless conveyor 30 comprising a belt 31 of any suitable material such as canvas, or rubberized fabric, to which is secured a plurality of slats 32 extending fore and aft across the belt 31 in laterally spaced relation. The upper or working flight 33 of the conveyor slides along a forward supporting plate 34 attached to the top of the Z-bar 11 by the bolts 13, and the rear edge of the upper flight 33 slides along an angular supporting member 35 attached to the rear wall 15. The forward edge of the upper flight 33 is protected by a Z-bar 36, which extends along the top of the plate 34 behind the cutter bar 12 and is also fixed to the main Z-bar 11 by the bolts 13. The Z-bar 36 overlaps the forward edge of the conveyor and serves to prevent harvested crop from lodging under the forward edge of the conveyor.

The upper edge of the back wall 15 is reenforced by means of a transversely extending angle frame bar 37.

The platform 10 is braced and supported by a plurality of fore and aft extending frame members 40, 41, 42, which are rigidly secured to the front Z-bar 11 and extend rearwardly between the upper flight 33 and the return or lower flight 43 of the conveyor belt 30. The back wall 15 is apertured to receive the rear ends of the frame members 40, 41, 42, the latter extending rearwardly beyond the back wall 15. The rear ends of the frame members 40, 41, 42 are rigidly attached to a tubular supporting beam 45 disposed transversely behind the platform 10. The frame member 40 at the grainward end of the platform is adjustably connected to the tubular beam 45, as will be described later, while the other two frame members 41, 42 are connected by bolts 46 to brackets comprising a pair of upper and lower strap members 47 rigidly welded to the tubular frame member 45. The apertures in the back wall 15 through which the frame members 40, 41, 42 extend, are reenforced by collars 48 which encircle the frame members and are securely bolted or riveted to the back wall.

The rear end of the platform 10 is carried on a pair of laterally spaced ground engaging wheels 50, 51, which are mounted at opposite ends of the tubular supporting beam 45, respectively, and disposed behind the platform 10 and inwardly of the outer ends thereof. Each of the wheels 50, 51 is journaled on an axle 52, which is fixed to the end of a supporting arm 53, which is rigidly welded or otherwise fixed to a collar 54 which fits over the end of the supporting beam 45. The collar 54 is fixed to the beam 45 by means of a bolt 55 which is inserted through aligned apertures in the collar 54 and beam 45, and is provided with a nut 56 threaded on the end of the bolt 55. Referring more particularly to Figure 5, the normal position of the wheels with respect to the beam 45 is indicated in dotted lines. This is the position of the wheels when the windrower is used for harvesting at a substantial height above the ground, but when it is desired to cut close to the ground, this position of the wheels would result in an extreme forward and downward tilt to the platform, but by swinging the supporting arms 53 rearwardly, the rear end of the platform can be lowered to bring the platform to a more level position. In the position of Figure 5, the bolt apertures in the collar 54 are aligned with another pair of apertures in the beam 45. Reference numeral 57 indicates the apertures in the beam 45, through which the bolt 55 extends when the arm 53 is in a vertical position.

The fore and aft extending beam 40 at the grainward end of the platform is pivotally connected by means of a bolt 60 to a forwardly extending plate 61 which is rigidly fixed, as by welding, adjacent the grainward end of the tubular beam 45. A set screw 62 is threaded into a threaded aperture in a lug 63 fixed to the lower edge of the plate 61 and extending underneath the frame member 40. The set screw 62 bears against the lower side of the frame member 40 and hence by tightening the set screw the beam 40 can be raised about the axis of the bolt 60 and thereby preventing any sag in the outer or grainward end of the cutter bar, said sag being resisted by a torsional stress in the tubular beam 45. The beam 40 and plate 61 are further rigidly secured together in adjusted position by means of a bolt 65 which is inserted through a suitable aperture in the beam 40 which is aligned with a vertically extending slot 66 in the plate 61, thus providing for vertical angular movement therebetween.

The frame members 41, 42, which are connected at the midpoint and at the stubbleward end of the supporting beam 45, respectively, extend through apertures in the Z-bar 11, and converge forwardly and toward the stubbleward end of the platform and are interconnected at their forward ends ahead of the platform by a transversely disposed pipe frame member 70, which is fixed at opposite ends thereof to brackets 71 which are attached to the forward ends of the frame members 41, 42. A hitch member 72 is pivotally connected to the pipe frame member 70 for vertical swinging movement about the axis of the latter, and comprises a pair of forwardly converging hitch frame members 73 swingably connected to the pipe frame member 70 at opposite ends thereof, respectively, and connected at their forward ends to a hitch plate 74 which is adapted to be connected to a tractor or other draft means.

The height of cut of the cutter bar is determined by adjustably fixing the angle between the draft member 72 and the platform 10, since the cutter bar and forward end of the platform are supported by the draft plate 74 on the tractor. The means for adjusting the angular relation between the hitch member and the platform will now be described. Extending rigidly forwardly from the platform is a lever structure comprising a bar 75 pivotally supported at its rear end on a bracket 76 which is carried on a transverse frame member 77 fixed at opposite ends thereof to the forwardly converging frame members 41, 42, respectively. A hand lever 78 is connected to the bar 75 near the rear end thereof by bolt 79 and extends upwardly and forwardly therefrom, and is connected by a second bolt 80 to a vertically extending bracket 81 fixed to the forward end of the bar 75. The hand lever 78 can be swung about the bolt 79 and connected to the bracket 81 in several vertically adjustable positions by inserting the bolt 80 through one of several apertures 82 in the bracket 81, thus placing the lever 78 at the most convenient height within reach of the tractor operator. The bar 75 is rigidly secured to the platform by a second bracket 85 which is welded to the pipe frame member 70, as best shown in Figure 6, and through which a bolt 86 extends vertically through an aligned hole in the bar 75. Hence it is evident that by lifting the lever 78, the entire platform frame of the windrower is raised about the axes of the rear supporting wheels 50, 51 since the lever structure is rigid with the platform and moves therewith as a unit. The platform is held in vertically adjusted position by means of a latch 88 mounted on the side of the lever 78 and engaging a notched sector 89 which is mounted by means of a bolt 90 on a lug 91 which is fixed to one of the hitch frame members 73. The latch 88 is disengageable by means of a hand lever 92 pivoted at the handle of the lever 78 and connected to the latch by an actuating rod 93. Thus it is evident that when the latch 88 is engaged with the notched sector 89, the hitch member 72 is fixed rigidly with the windrower platform and therefore can be supported from the hitch plate 74 on the tractor drawbar.

The platform 10 is counterbalanced by means of a counterbalancing spring 100 connected at its rear end to a rod 101 which is threaded to receive a nut 102, which bears against the rear surface of a lug 103 fixed to the frame member 73 of the draft member 72. The forward end of the spring 100 is connected to a downwardly extending arm 104 fixed to a rock shaft 105, which extends transversely of the hitch member 72 and is journaled in suitable brackets 106, 107 on the hitch frame member 73. A rearwardly extending arm 108 is also fixed to the rock shaft 107 and is pivotally connected adjacent its rear end to a U-shaped guide member 110 by means of a bolt 111. The U-shaped guide member 110 embraces the lower edge of the lifting beam 75 and slides therealong, whereby the tension of the spring 100 exerts a rearwardly acting force against the arm 104 and therefore tending to swing the rearwardly extending arm 108 upwardly and hence exerting a lifting force through the sliding guide member 110 against the bar 75.

The rod 101 is attached to the rear end of the spring 100 by a suitable swivel connection, and the nut 102 is fixed to the lug 103, as by welding, so that the tension of the spring can be adjusted by merely rotating the rod 101. For this purpose the rod 101 extends rearwardly and is connected at its rear end to the shaft of a crank member 116 by a universal joint connection 115, which preferably is of a simple construction, as, for instance, a pair of interlinked eyes. The crank member 116 is supported in a pair of brackets 117 fixed to the bar 75 by the bolt 86 and thus by rotating the crank 116 the amount of counterbalancing force can be adjusted.

Power for driving the sickle and the conveyor is obtained from the power take-off shaft of the tractor by means of a power transmitting shaft 120, which is connected through a pair of universal joints 121 to a splined connector 122 adapted to fit over the splined end of the power take-off shaft. The shaft 120 is supported in a bearing 123 which is swingably mounted on a pair of links 124 connected to the hitch member 72 by means providing for fore and aft swinging movement to accommodate relative movement between the tractor and the windrower. The power shaft 120 has a telescoping connection 125 which is connected through a universal joint 126 to a crank shaft 127 which is journaled in a bearing 128. The bearing 128 is supported on a vertical plate 129 fixed to the forward end of the frame member 42 and is attached thereto by bolts 130 which extend through apertures in a pair of vertically extending flanges 131, 132 formed integrally with the bearing 128 and through aligned vertically extending slots 133 in the plate 129. The plate 129 has a pair of fore and aft spaced ears or lugs 134 extending over the bearing 128, and is provided with set screws 135 which extend downwardly through suitably tapped apertures in the lugs 134 and bear against the upper surface of the bearing 128. Another set screw 136 is threaded into a lug 137 on the plate 129 and bears up against a flange 138 formed integral with the bearing 128 and substantially midway between the front and rear ends thereof. Hence, by means of the three set screws 135, 136 the bearing 128 can be shifted vertically and also tilted fore and aft to adjust the crank shaft 127 for the purpose of tightening a drive chain 140 which is trained over a sprocket 141 on the rear end of the crank shaft 127 and a sprocket 142 on the forward end of the shaft 27 of the stubbleward conveyor roller 26, by means of which the conveyor belt is driven.

After the crank shaft bearing 128 is suitably positioned to align the sprockets 141 and 142, the bearing 128 is fixed in adjusted position by tightening the bolts 130 and also the lock nuts 143 on the set screws 135, 136.

The crank shaft 127 is provided with a crank portion 145 between the bearing 128 and the sprocket 141, and on the crank portion 145 is journaled a pitman bearing 146 connected to the end of the pitman rod 147, the opposite end of which is connected to the sickle 150 which cooperates with the cutter bar 12 in a conventional manner.

The windrower is equipped with any suitable type of harvester reel 151 mounted on a shaft 152 which is journaled at opposite ends thereof in bearings 153, 154, respectively, and the bearings are mounted on a pair of rearwardly extending arms 155, 156. The rear ends of the arms 155, 156 are pivotally connected to brackets 157 which are mounted on the upper edge of the back wall 15. The height of the reel above the cutter bar is adjustably fixed by means of a vertical bracing member 158 which is attachable to the reel supporting arm 156 in various positions of adjustment.

The reel 151 is driven from the stubbleward ground wheel 51 by means of a chain 160 connected to a sprocket 161 on the axle 52 of the wheel 51 and which drives a sprocket 162 which is fixed on a transversely disposed countershaft 163 journaled in a pair of laterally spaced bearing brackets 164. A second chain 165 is trained around a sprocket 166 on the opposite end of the countershaft 163 and extends forwardly to a sprocket 167 on the inner end of the reel shaft 152. The sprocket 167 is journaled on the reel shaft and is connected thereto through a conventional slip clutch 168.

The windrower is prepared for endwise transport by removing the bolt 86 which connects the lifting bar 75 with the bracket 85. This permits the draft member 72 to be raised about the axis of the pipe frame member 70, lifting the lifting bar 75 and the lever 78 about the pivotal connection of the lever structure with the bracket 76. Inasmuch as the hitch member 72 and the lever structure pivot upwardly about different axes, there is necessarily a relative movement between the notched sector 89 and the hitch member 72 but this is accommodated by the pivot bolt 90 which connects the sector 89 to the hitch member 72.

The draft structure is locked in raised position by inserting a bolt 170 through suitable openings 171, 172 in the sliding guide member 110 and the bar 75, which can be aligned in transport position. The power shaft 120 in transport position, swings about the universal joint 126 relative to the crank shaft 127. For endwise transport the grainward wheel 50 is dismounted from the supporting beam 45 by removing the bolt 55, and the wheel is then mounted on a special transport fixture 175 comprising a short tubular member, the end of which is adapted to receive the collar 54 of the wheel support 53 and is provided with aligned apertures 176 to receive the bolt 55. The fixture 175 is supported on the frame member 41 by means of a bracket 177. The stubbleward wheel 51 is similarly removed from the opposite end of the beam 45 and is transferred to a transport fixture 178 comprising a short tubular member adapted to receive the collar 54 of the wheel support 53 and having an aperture 179 adapted to receive the bolt 55. The tubular member 178 is mounted on a vertically disposed standard 180, which is rigidly fixed to the beam 45 opposite the above-mentioned fitting 175. The wheels 50, 51 are disposed in planes generally perpendicular to the direction of normal travel of the windrower so that the latter may be towed in an endwise direction. For transport, the windrower is drawn by means of a tongue 181 which is bolted to the supporting beam 45 by means of a bolt 182 and to a bracket 183 by means of a bolt 184. The bracket 183 is rigidly fixed to the grainward end of the windrower frame.

We do not intend to confine our invention to the exact details shown and described herein, except as limited by the claims which follow.

We claim:

1. A windrower comprising a platform frame including a pair of fore and aft spaced transversely extending parallel members and a plurality of interconnecting frame members, a draft frame extending forwardly from the forward transverse member inwardly of the stubbleward end thereof for supporting the front portion of said frame on a tractor, a cutter bar extending from said draft frame along said forward transverse frame member, a pair of fore and aft extending conveyor rollers journaled at opposite ends of said frame and disposed generally in the plane of said interconnecting frame members, a flexible endless conveyor extending across the entire width of said frame over said interconnecting members behind said cutter bar and said draft frame and discharging from the extreme stubbleward end of said frame, said conveyor having a return flight disposed beneath said interconnecting frame members, and a pair of ground wheels for supporting said platform disposed rearwardly of the latter and inwardly of the outer ends of said conveyor.

2. A windrower comprising a platform frame including a pair of fore and aft spaced transversely extending members and a plurality of interconnecting frame members extending rearwardly beyond said rear transverse member, a supporting beam interconnecting the rear ends of said interconnecting members, a pair of supporting wheels mounted on said beam, a draft frame extending forwardly from the forward transverse member inwardly of the stubbleward end thereof for supporting the front portion of said frame on a tractor, a cutter bar extending from said draft frame along said forward transverse frame member, a pair of fore and aft extending conveyor rollers journaled at opposite ends of said frame and disposed generally in the plane of said interconnecting frame members, and a flexible endless conveyor extending across the entire width of said frame over said interconnecting members behind said cutter bar and said draft frame and discharging from the extreme stubbleward end of said frame, said conveyor having a return flight disposed beneath said interconnecting frame members.

3. A harvester platform comprising a transverse frame including a transverse beam disposed at the rear thereof, a pair of laterally spaced arms, a supporting wheel journaled on each of said arms, means rigidly connecting said arms to said beam, and means for adjusting at least one of said arms angularly relative to the other arm.

4. A harvester platform comprising a transverse frame, a transverse beam disposed behind said frame and rigidly fixed to the latter adjacent one end thereof, ground engaging supports for said beam, and means for angularly adjustably connecting the other end of said beam to said frame for stressing said beam in torsion and thus providing a lifting force against the end of the frame.

5. A windrower comprising a transverse frame, a tubular torsion member disposed behind said frame and rigidly fixed to the latter adjacent one end thereof, a pair of supporting arms mounted on said tubular member, a ground wheel journaled at the end of each of said arms, a hitch member attached to the forward end of said frame adjacent said one end thereof, an arm fixed to said torsion member adjacent the other end thereof, and means for angularly adjustably connecting said last mentioned arm to said frame providing for stressing said torsion member to exert a lifting force on the outer end of the frame.

6. A harvester platform comprising front and rear transverse frame members, a roller extending therebetween, a flexible endless conveyor trained over said roller, and a fore and aft extending frame member disposed between the upper and lower flights of said conveyor and interconnecting said transverse frame members.

7. A harvester platform comprising a frame, including a pair of parallel frame members and a plurality of interconnecting frame members extending between said parallel members, a pair of rollers extending between said parallel members at opposite ends thereof, respectively, a flexible endless conveyor trained over said rollers and having upper and lower flights disposed on opposite sides of said interconnecting frame members, a crop gathering mechanism disposed along one edge of said frame for delivering crop to said conveyor, and means adjacent the opposite edge of said frame for supporting the latter and providing for vertical movement thereof to raise and lower said crop gathering means.

8. A windrower comprising a transversely disposed frame including front and rear parallel members and interconnecting frame members fixed thereto, a transverse cutter bar supported on said front frame member, a flexible endless conveyor disposed behind said cutter bar and movable laterally over said interconnecting frame members and having a return flight disposed beneath the latter, a ground engaging support for said frame, and means for tilting the latter on said support to raise and lower said cutter bar.

9. A windrower comprising a transversely disposed frame including front and rear parallel members and interconnecting frame members fixed thereto and extending rearwardly thereof, a transverse supporting beam fixed to the rear ends of said interconnecting frame members, ground engaging supports mounted on said beam, a transverse cutter bar supported on said front frame member, a flexible endless conveyor disposed behind said cutter bar and movable laterally over said interconnecting frame members and having a return flight disposed beneath the latter, and draft means connected at one end of said frame.

10. A harvester comprising a platform, supporting means therefor, harvesting mechanism mounted thereon, a forwardly extending power shaft adapted to be connected to the power take-off shaft of a tractor, a bearing in which said power shaft is journaled, shiftable means for rigidly mounting said bearing on said platform, a wheel fixed to said power shaft, and a flexible power transmitting member trained over said wheel and connected to drive said mechanism, said flexible member being tightened by shifting said bearing.

11. A harvester comprising a platform, a cutter bar mounted thereon, a reciprocating sickle on said cutter bar, a power shaft disposed substantially in the plane of and perpendicular to said sickle, a crank connected to said shaft, a pitman connecting said sickle with said crank, a wheel fixed to said shaft, a second wheel mounted on said platform and connected to mechanism thereon, said wheels being spaced apart generally vertically, a flexible power transmitting member trained over said wheels, and bearing means for supporting said power shaft, said bearing means being mounted on said platform by means providing vertical adjustment thereof to tighten and loosen said flexible member without affecting the register of said sickle relative to said cutter bar.

12. A windrower comprising a platform, a cutter bar mounted thereon, a reciprocating sickle on said cutter bar, a power shaft disposed substantially in the plane of and perpendicular to said sickle, a crank connected to said shaft, a pitman connecting said sickle with said crank, a conveyor movable over said platform, a roller for driving said conveyor, driving and driven wheels connected to said power shaft and roller, respectively, and spaced apart generally vertically, a flexible power transmiting member trained over said wheels, and bearing means for supporting said power shaft, said bearing means being mounted on said platform by means providing vertical adjustment thereof to tighten and loosen said flexible member without affecting the register of said sickle relative to said cutter bar.

13. In an implement of the class described, a wheel supported frame, a draft member pivotally connected thereto for relative vertical swinging movement, a lever structure pivotally connected to said frame for relative vertical swinging movement, whereby for transport purposes both said draft member and said lever structure are swingable upwardly about said pivots, detachable means for rigidly fixing said lever structure to said frame during field operation, and means for adjustably locking said lever structure to said draft member in selected positions of relative vertical adjustment.

14. In an implement of the class described, a wheel supported frame, a draft frame pivotally connected thereto for relative vertical swinging movement, a lever structure pivotally mounted on one of said frames for relative vertical swinging movement, detachable means for rigidly fixing said lever structure to said one frame during field operation, and means for adjustably locking said lever structure to the other of said frames in selected positions of relative vertical adjustment, said detachable means being removable to permit both said lever structure and said draft frame to be folded upwardly to a transport position.

15. In an implement of the class described, a wheel supported frame, a draft frame pivotally connected thereto for relative vertical swinging movement, a lever structure pivotally mounted on one of said frames for relative vertical swinging movement, detachable means for rigidly fixing said lever structure to said one frame during field operation, a rack member pivotally mounted on the other of said frames, and latch means for adjustably locking said lever structure to said rack member in selected positions of relative vertical adjustment, said detachable means being removable to permit said lever structure, said draft frame, and said rack member to be folded to transport position.

16. In an implement of the class described, a wheel supported frame, a draft member pivotally connected thereto for relative vertical swinging movement, a lever structure pivotally connected to said frame for relative vertical swinging movement, detachable means for rigidly fixing said lever structure to said frame during field operation, a rack member pivotally mounted on said draft member, and latch means for adjustably locking said lever structure to said rack member in selected positions of vertical adjustment, said detachable means being removable to permit said lever structure, said draft member, and said rack member to be folded to transport position.

17. In an implement of the class described, a wheel supported frame, a draft member pivotally connected thereto for relative vertical swinging movement, a lever structure fixed to said frame and extending forwardly over said draft member, latch means for adjustably locking said lever structure in selected positions of adjustment, a crank arm pivotally mounted on said draft member, a sliding connection between said crank arm and said lever structure, and a lifting means connected to said crank arm and adapted to exert a lifting force through said arm against said lever structure.

18. In an implement of the class described, a wheel supported frame, a draft member pivotally connected thereto for relative vertical swinging movement, a lever structure fixed to said frame and extending forwardly over said draft member, a bell crank disposed beneath said lever structure and having a sliding connection with the latter, pivot means for mounting said bell crank forwardly on said draft member for vertical swinging movement, and a spring connected to said bell crank and extending rearwardly under the latter and normally stressed in tension to exert a lifting force through said crank upon said lever structure.

19. A windrower comprising a transverse platform frame, a transverse supporting beam disposed rearwardly thereof and rigidly fixed thereto, a pair of laterally spaced ground wheels, brackets for said wheels detachably connected to said beam, a pair of supports on said frame at front and rear thereof, to which said wheel supporting brackets are attachable, respectively, for transport purposes, and a tongue having detachable means for rigidly attaching the same to said supporting beam for towing said frame endwise during transport.

20. A windrower comprising a transversely disposed front frame member, a bottom wall and a back wall fixed thereto, a pair of rollers extending fore and aft between said frame member and said back wall, a flexible endless conveyor trained over said rollers, and frame members extending from said front member to said back wall and rigidly fixed thereto, said frame members being disposed between the upper and lower flights of said conveyor.

21. A windrower comprising a transverse platform frame, a draft member connected thereto adjacent one end thereof for supporting the forward end on a tractor, ground wheel means for supporting the rear end of said frame, a transversely disposed torsion beam member extending across said frame and fixed to the latter adjacent one end thereof, and means for angularly adjustably connecting the other end of said beam to said frame for stressing said beam in torsion and thus providing a lifting force at the end of the frame opposite said draft member.

22. A harvester platform comprising a generally rectangular frame, a pair of spaced parallel rollers journaled thereon, a flexible endless conveyor trained over said rollers, and frame bracing members traversing said frame between the two flights of said conveyor.

23. A harvester platform comprising a generally rectangular frame, a crop gathering means supported along one edge thereof, means at the opposite side of said frame for supporting the latter, a pair of spaced parallel rollers journaled on said frame, a flexible endless conveyor trained over said rollers, frame bracing members traversing said frame between the upper and lower flights of said conveyor, and draft means connected to said bracing members.

24. A harvester platform comprising a generally rectangular frame, a crop gathering means supported along one edge thereof, means at the opposite side of said frame for supporting the latter, a pair of laterally spaced rollers journaled on said frame, a flexible endless conveyor trained over said rollers, frame bracing members fixed to, and traversing said frame between the upper and lower flights of said conveyor and extending forwardly ahead of said frame adjacent one end thereof, a draft member pivotally connected to the forward ends of said members on a transverse axis, and means for adjustably fixing said draft member relative to said frame.

25. A harvester platform comprising a frame including a pair of generally parallel transversely disposed frame members, a plurality of frame members interconnecting said transverse members and extending forwardly and rearwardly beyond the latter, a transverse beam connected to the rear ends of said members, ground wheels mounted on said beam for supporting the frame, draft means connected to the forward extensions of said interconnecting frame members, crop gathering means supported on the forward edge of said frame, and a canvas platform conveyor extending transversely of said frame and having an upper working flight disposed over said interconnecting frame members and a lower return flight beneath the latter.

26. In an implement of the class described, a wheel supported frame, a draft member pivotally connected thereto for relative vertical swinging movement, a lever structure fixed to said frame and extending forwardly over said draft member, a bell crank disposed beneath said lever structure and having a sliding connection with the latter, pivot means for mounting said bell crank forwardly on said draft member for vertical swinging movement, a spring connected to said bell crank and extending rearwardly under the latter and normally stressed in tension to exert a lifting force through said crank upon said lever structure, and means for locking said bell crank relative to said lever structure to condition the implement for transport.

27. In an implement of the class described, a wheel supported frame, a draft member pivotally connected thereto for relative vertical swinging movement, a lever structure pivotally connected to said frame for relative vertical swinging movement, detachable means for rigidly fixing said lever structure to said frame during field operation, a rack member pivotally mounted on said draft member, latch means for adjustably locking said lever structure to said rack member in selected positions of vertical adjustment, a bell crank pivotally mounted on said draft member, a sliding connection between said crank arm and said lever structure, spring means connected to said bell crank and biased to exert a lifting force through said arm against said lever structure, said detachable means being removable to permit said lever structure, said draft member, and said rack member to be folded to transport position, and means for locking said crank arm relative to said lever structure to hold the latter and the draft member in said folded transport position.

28. A construction comprising a platform, supporting wheels positioned at one side of the platform adjacent opposite ends thereof, an element resistant to twisting extending along the said one side of the platform, between the platform and the wheels, a first member connecting one wheel and one end of the platform so as to support the same and being secured to one end of the element against angular movement with respect thereto, a second member connecting the other wheel and the other end of the platform so as to support the same and being connected to the other end of the element so as to be permitted angular movement with respect thereto about the element as an axis, and adjustable means acting between the element and the second member to effect angular movement between the element and the member and thereby to raise the said other end of the platform.

29. A construction comprising a platform, hitch means connecting one end of the platform to a draft means and serving to prevent sag of the said one end of the platform, supporting wheels positioned at one side of the platform adjacent opposite ends thereof, a torque tube extending along the said one side of the platform between the wheel and the platform, a first supporting member connecting one wheel and the said one end of the platform and secured to one end of the torque tube so as to prevent angular movement of the said one end of the torque tube, a second supporting member connecting the other supporting wheel and the other end of the platform and being connected to the other end of the torque tube so as to be permitted angular movement with respect to the torque tube and about the same as an axis, and adjustable means acting between the said other end of the torque tube and the second member to effect angular movement between these parts and thereby to raise the said other end of the platform.

30. A construction comprising a generally horizontal frame, draft means supporting one side of said frame and offset toward one end thereof, ground supported means for carrying the other side of said frame, a torsion beam member extending along said frame, means fixing one end of said beam to said frame and means for twisting the opposite end of said beam for imposing a torsional stress therein and for connecting said beam to said frame to transmit torsional force from said beam to said frame exerting a lifting force thereon.

31. A construction comprising a generally horizontal frame, a plurality of supports engaging said frame at spaced points, and means for transmitting supporting force to unsupported portions of said frame comprising an elongated beam fixed at one end to said frame, and means for angularly adjusting the opposite end of said beam relative to said frame.

32. In combination, an ambulatory frame of generally rectangular form, supporting means engaging said frame adjacent three corners thereof, and means for transmitting a lifting force to the fourth corner comprising a beam extending along one side of said frame and rigidly fixed thereto at one end of said beam, and adjustable means connecting the other end of said beam to said frame providing for adjustably imposing a torsional stress in said beam for leveling said frame.

33. A construction comprising a platform, supporting wheels positioned at one side of the platform adjacent opposite ends thereof, an element resistant to twisting extending along one side of the platform, a first member rigidly connecting one end of said platform and said element to prevent angular movement of the latter relative thereto, a second member for connecting the other end of said platform to said element and providing for angular movement of said member relative to said element, and adjustable means acting between said element and the second member to effect angular movement between the element and the member, and thereby to raise the said other end of the platform.

34. A construction comprising a platform, hitch means connecting one end of the platform to a draft means and serving to prevent sag of the said one end of the platform, supporting wheels positioned at one side of the platform adjacent opposite ends thereof, a torque tube extending along the said one side of the platform between the wheels and the platform and mounted on said wheels, a first supporting member connected to one end of the platform and secured to one end of the torque tube so as to prevent angular movement of the said one end of the torque tube, a second supporting member connecting the other end of the platform with the torque tube so as to be permitted angular movement with respect to the torque tube, and adjustable means acting between the said other end of the torque tube and the second member to effect angular movement between these parts and thereby to raise the said other end of the platform.

35. A construction comprising a generally horizontal frame, draft means supporting one side of said frame and offset toward one end thereof, ground supported means for carrying the other side of said frame, a torsion beam member extending along said frame, means fixing one end of said beam to said frame and means for angularly adjusting the other end of said beam relative to said frame to level the platform.

36. A construction comprising a generally horizontal frame, draft means supporting one side of said frame and offset toward one end thereof, ground supported means for carrying the other side of said frame, a torsion beam member extending along said frame, means fixing one end of said beam to said frame and means for angularly adjusting the other end of said beam relative to said frame to level the platform, said last mentioned means comprising a supporting member fixed to said platform and pivotally connected to said beam, an arm fixed to said beam and extending adjacent said supporting member, and a threaded adjusting member interconnecting said arm and said supporting member for shifting them angularly relative to each other.

ALVIN W. OEHLER.
DONALD L. ADAMS.
SHELLMAN S. HARTER.